UNITED STATES PATENT OFFICE.

JOHN SMITH, OF ST. LOUIS, MISSOURI.

PLASTIC COMPOSITION FOR BRICKS.

1,385,757.     Specification of Letters Patent.     Patented July 26, 1921.

No Drawing. Application filed July 17, 1919, Serial No. 311,510. Renewed April 2, 1921. Serial No. 458,084.

*To all whom it may concern:*

Be it known that I, JOHN SMITH, a citizen of the United States, residing at St. Louis, in the State of Missouri, have invented certain new and useful Improvements in Plastic Compositions for Bricks; and I do hereby declare the following to be a full, clear, and exact description of the invention, such as will enable others skilled in the art to which it appertains to make and use the same.

The present invention relates to plastic composition, and aims to provide such a composition for the production of bricks or building blocks including in addition to suitable cement, brick dust and coal ashes, in order that the composition will provide a brick of good quality and strength, and of desired brick color.

The composition comprises suitable cement, coal ashes and brick dust in about equal quantities or proportions, although they may vary slightly under different conditions, and these ingredients are mixed with a suitable quantity of water to the desired consistency, and the mixture is then permitted to set in molds for about seven or eight days. The composition will then have hardened, and the bricks or blocks are extremely solid and compact, that is, referring to the granular structure thereof. The use of coal ashes and brick dust with a suitable cement provide a plastic composition which will be strong and durable, and of brick color. Different colors can be provided by using brick dust of different colors, brick dust serving as a color medium as well as assisting in binding the particles of the mixture together.

In some cases, sand can be used instead of coal ashes, when desired.

Having thus described the invention, what is claimed as new is:—

A plastic composition comprising cement, coal ashes and brick dust of substantially equal proportions.

In testimony whereof I have signed my name to this specification in the presence of two subscribing witnesses.

JOHN SMITH

Witnesses:
F. H. SPEARS,
A. F. WOODARD.